(12) United States Patent
Ikeda et al.

(10) Patent No.: US 9,382,155 B2
(45) Date of Patent: Jul. 5, 2016

(54) GYPSUM DISPERSANT

(71) Applicants: TOHO CHEMICAL INDUSTRY CO., LTD., Tokyo (JP); YOSHINO GYPSUM CO., LTD., Tokyo (JP)

(72) Inventors: Akira Ikeda, Sodegaura (JP); Seiichi Koshisaka, Sodegaura (JP); Katsutoshi Sato, Sodegaura (JP)

(73) Assignees: Toho Chemical Industry Co., Ltd. (JP); Yoshino Gypsum Co., Ltd. (JP)

( * ) Notice: Subject to any disclaimer, the term of this patent is extended or adjusted under 35 U.S.C. 154(b) by 0 days.

(21) Appl. No.: 14/385,204

(22) PCT Filed: Mar. 14, 2013

(86) PCT No.: PCT/JP2013/057232
§ 371 (c)(1),
(2) Date: Sep. 15, 2014

(87) PCT Pub. No.: WO2013/137402
PCT Pub. Date: Sep. 19, 2013

(65) Prior Publication Data
US 2015/0045512 A1    Feb. 12, 2015

(30) Foreign Application Priority Data

Mar. 14, 2012  (JP) ................................ 2012-058030

(51) Int. Cl.
| | |
|---|---|
| *C04B 16/04* | (2006.01) |
| *C04B 28/14* | (2006.01) |
| *C08G 65/24* | (2006.01) |
| *C08L 55/00* | (2006.01) |
| *C04B 40/00* | (2006.01) |
| *C04B 24/28* | (2006.01) |
| *C04B 103/40* | (2006.01) |
| *C08L 33/00* | (2006.01) |

(52) U.S. Cl.
CPC .............. *C04B 16/04* (2013.01); *C04B 24/281* (2013.01); *C04B 28/14* (2013.01); *C04B 40/0039* (2013.01); *C08G 65/24* (2013.01); *C08L 55/00* (2013.01); *C04B 2103/408* (2013.01); *C08L 33/00* (2013.01)

(58) Field of Classification Search
CPC .. C04B 28/14; C04B 2103/408; C04B 16/04; C08G 65/24; C08G 65/2624
USPC .......................................... 525/187; 106/732
See application file for complete search history.

(56) References Cited

U.S. PATENT DOCUMENTS

| | | | |
|---|---|---|---|
| 5,051,124 A * | 9/1991 | Pera .......................... | C02F 1/50 504/160 |
| 5,681,862 A * | 10/1997 | Hollis ..................... | A01N 33/12 514/642 |
| 2006/0124034 A1* | 6/2006 | Okazawa et al. ............. | 106/823 |
| 2008/0060556 A1* | 3/2008 | Jacquet et al. ................ | 106/802 |
| 2011/0088599 A1* | 4/2011 | Koyata et al. ................. | 106/803 |
| 2015/0065614 A1* | 3/2015 | Kuo ......................... | C09K 8/18 524/4 |

FOREIGN PATENT DOCUMENTS

| | | |
|---|---|---|
| JP | S641426 B2 | 1/1989 |
| JP | H06-212059 A | 8/1994 |
| JP | 3067811 B2 | 7/2000 |
| JP | 3733821 B2 | 1/2006 |
| JP | 2007-320786 A | 12/2007 |
| JP | 2009-034828 A | 2/2009 |
| JP | 2011-136844 A | 7/2011 |

OTHER PUBLICATIONS

Fei, et al, "Effects of Gypsum on Cementitious Systems with Different Mineral Mixtures," Key Eng'g Materials, vol. 509 (2012), pp. 20-25.*
Material Safety Data Sheet: Portland Cement, Drake Cement, 7 pages (Undated).*
Search Report and Written Opinion issued in Application No. PCT/JP2013/057232, mailed Jun. 4, 2013.

* cited by examiner

*Primary Examiner* — Fred M Teskin
(74) *Attorney, Agent, or Firm* — Fishman Stewart PLLC

(57) ABSTRACT

There is provided a gypsum dispersant and a gypsum additive that improve the fluidity of gypsum slurry even if gypsum raw materials used are different in quality and that do not induce delay of curing of gypsum slurry. A gypsum dispersant, including: (A) a polycarboxylic acid polymer; and (B) a polymer obtained by a reaction of an alkylene diamine and/or a monoamine and an epihalohydrin as essential components.

15 Claims, No Drawings

GYPSUM DISPERSANT

TECHNICAL FIELD

The present invention relates to a gypsum dispersant that is added when a variety of gypsum molded products such as gypsum boards are manufactured, in order to improve the fluidity of gypsum slurry composed of gypsum and water.

BACKGROUND ART

Gypsum boards have been widely used mainly as interior materials of buildings, because of their excellent fireproof, sound insulating, and heat insulating properties, as well as their availability at low prices. Gypsum boards are manufactured generally by a pouring method. In the method, gypsum slurry that is composed of calcined gypsum, water, a dispersant, and other additive(s), is stirred and kneaded with an expanded foam in a mixing machine; the mixture is poured between the sheets of base paper to be sandwiched; and the thickness and the width are adjusted, and then cured, cut, and dried to obtain a gypsum board. Different types of gypsum boards are available, such as normal boards, hard boards, reinforced boards, and decorative boards. Although types of additives, mixing amounts, addition of reinforced materials, and the like may be changed depending on characteristics required for each of the boards, the boards can be manufactured by the same method.

When the gypsum slurry is manufactured, a dispersant is used in order to enhance ductility of a gypsum board to base paper, as well as to reduce a unit water amount in the manufacture of slurry, which enhances drying efficiency of the slurry, and to increase the density of a molded board so that a high strength board is obtained.

Formaldehyde-based compounds such as a naphthalenesulfonate formaldehyde condensate, a melaminesulfonate formaldehyde condensate, and a formaldehyde condensate of a bisphenol and aminobenzenesulfonic acid have been conventionally and widely used as dispersants for gypsum (see Patent Documents 1 and 2).

Patent Document 3 discloses a self leveling aqueous gypsum composition having a high flow value and an excellent self leveling property, which is prepared by adding a polycarboxylic acid dispersant to an aqueous gypsum composition.

Patent Document 4 discloses a gypsum dispersant characterized by including a water soluble amphoteric polymer compound as a main component. The water soluble amphoteric polymer compound contains a structural unit having a nitrogen atom selected from an amido group, an amino group, and an imino group; a structural unit having a carboxylic acid group; and a structural unit having a polyalkylene glycol group, and the compound is obtained by polymerization. However, due to impurities contained in gypsum raw materials, the effects of the dispersant may not be stably exerted, and thus an improvement has been needed.

PRIOR ART DOCUMENTS

Patent Documents

Patent Document 1: Japanese Patent No. 3067811 (JP 3067811 B2)
Patent Document 2: Japanese Patent No. 3733821 (JP 3733821 B2)
Patent Document 3: Japanese Examined Patent Application Publication No. S64-1426 (JP S64-1426 B)
Patent Document 4: Japanese Patent Application Publication No. 2007-320786 (JP 2007-320786 A)

SUMMARY OF THE INVENTION

Problem to be Solved by the Invention

Although the above-mentioned conventional polycarboxylic acid dispersants show excellent dispersibility for gypsum slurry by properly selecting the conditions for use, such as pH, it also causes delay of curing, which results in a decrease in productivity of gypsum boards.

There are a wide variety of gypsum raw materials such as imported natural gypsum, flue gas desulfurization gypsum emitted from desulfurization devices used in power plants or smelters, by-product gypsum such as phosphoric acid gypsum and fluorogypsum, and recycled gypsum separated and recovered from waste gypsum boards. They are used differently between factories in order to reduce transportation costs and the like. Accordingly, impurities and the like contained in gypsum are different between the factories, and thus the properties of a gypsum water reducing agent may not be fully exercised.

In view of the above-described disadvantages such as a problem to be solved by the present invention, the present invention provides a gypsum dispersant and a gypsum additive that improve the fluidity of gypsum slurry even if gypsum raw materials used are different in quality and that do not induce delay of curing of gypsum slurry.

Means for Solving the Problem

As a result of intensive study to solve the above problem, the inventors of the present invention have found the present invention.

Specifically, the present invention relates to a gypsum dispersant, characterized by comprising: (A) a polycarboxylic acid polymer; and (B) a polymer obtained by a reaction of an alkylene diamine and/or a monoamine and an epihalohydrin as essential components.

The present invention also relates to a gypsum additive comprising: a polymer obtained by a reaction of an alkylene diamine and/or a monoamine and an epihalohydrin as essential components, which is mixed in order to improve the fluidity of gypsum slurry.

Effects of the Invention (A) the polycarboxylic acid polymer is used in combination with (B) the reaction product of an alkylene diamine and an epihalohydrin in a gypsum dispersant of the present invention. Because of this, even if gypsum raw materials used are different in quality, sufficient fluidity can be stably imparted regardless of the types.

Furthermore, by adding the gypsum dispersant to gypsum slurry, gypsum boards can be manufactured without decreasing productivity.

MODES FOR CARRYING OUT THE INVENTION

Hereinafter, the present invention will be explained in detail.

As (A) the polycarboxylic acid polymer, a polymer having a structural unit derived from (a) a polyalkylene glycol unsaturated monomer and a structural unit derived from (b) an unsaturated carboxylic acid monomer can preferably be used.

The structural unit derived from (a) the polyalkylene glycol unsaturated monomer can be represented by General Formula (2):

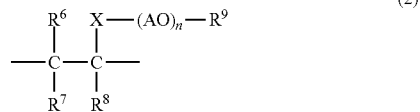

(where each of $R^6$, $R^7$, $R^8$, and $R^9$ is independently a hydrogen atom or a $C_{1-22}$ hydrocarbon group, X is —COO— or —(CH$_2$)$_a$O—, a is an integer of 1 to 20, AO is a $C_{2-4}$ alkylene oxy group, and n is the number of moles of added alkylene oxy groups and is 1 to 200).

In Formula (2), each of $R^6$, $R^7$, $R^8$, and $R^9$ is independently a hydrogen atom or a $C_{1-22}$ hydrocarbon group, preferably a hydrogen atom or a $C_{1-8}$ alkyl group, and more preferably a hydrogen atom, a methyl group, an ethyl group, a propyl group, or a butyl group.

AO is a $C_{2-4}$ alkylene oxy group, and specific examples thereof include an ethylene oxy group, a propylene oxy group, and a butylene oxy group. When AO is composed of two or more types of alkylene oxy groups, these alkylene oxy groups can be any of a block addition or a random addition.

n is the number of moles of added alkylene oxy groups and is 1 to 200, preferably 5 to 120, more preferably 10 to 100, and still more preferably 40 to 100.

The followings are specific examples of (a) the polyalkylene glycol unsaturated monomer.

Alkoxy poly alkylene glycol mono(meth)acrylates such as methoxy polyethylene glycol mono(meth)acrylate, methoxy{polyethylene glycol(poly)propylene glycol}mono (meth)acrylate, ethoxy polyethylene glycol mono(meth) acrylate, ethoxy{polyethylene glycol(poly)propylene glycol}mono(meth)acrylate, propoxy polyethylene glycol mono(meth)acrylate, propoxy{polyethylene glycol(poly) propylene glycol}mono(meth)acrylate, butoxy polyethylene glycol mono(meth)acrylate, and butoxy{polyethylene glycol (poly)propylene glycol}mono(meth)acrylate; and unsaturated alcohol polyalkylene glycol adducts such as a vinyl alcohol alkylene oxide adduct, a (meth)allyl alcohol alkylene oxide adduct, a 3-buten-1-ol alkylene oxide adduct, an isoprene alcohol(3-methyl-3-buten-1-ol)alkylene oxide adduct, a 3-methyl-2-buten-1-ol alkylene oxide adduct, a 2-methyl-3-buten-2-ol alkylene oxide adduct, a 2-methyl-2-buten-1-ol alkylene oxide adduct, and a 2-methyl-3-buten-1-ol alkylene oxide adduct. Note that, in the present invention, (meth)acrylate refers to both acrylate and methacrylate, and (meth)allyl alcohol refers to both allyl alcohol and methallyl alcohol.

Specific examples of (b) the unsaturated carboxylic acid monomer include acrylic acid, methacrylic acid, maleic acid, fumaric acid, itaconic acid, and an unsaturated fatty acid, as well as acid anhydrides thereof, such as maleic anhydride. Among them, methacrylic acid is particularly preferable.

In (A) the polycarboxylic acid polymer, examples of (c) a copolymerizable monomer other than the above-mentioned monomers (a) and (b), include the following known monomers; (1) (non)aqueous monomers: methyl (meth)acrylate, ethyl (meth)acrylate, butyl (meth)acrylate, styrene, and the like; (2) anion monomers: vinyl sulfonates, styrene sulfonates, methacrylic acid phosphoesters, and the like; (3) amide monomers: acrylamide, an alkylene oxide adduct of acrylamide, and the like; (4) polyamide polyamine monomers: a compound of a condensate of a polyamide polyamine and (meth)acrylic acid, which contains an alkylene oxide if desired.

A copolymerization ratio of the monomers (a) to (c) is preferably (a):(b):(c)=50 to 95:5 to 50:0 to 40, and more preferably (a):(b):(c)=70 to 90:10 to 30:0 to 20, based on mass.

A method of manufacturing (A) the polycarboxylic acid polymer is not particularly limited, and known polymerization methods, such as solution polymerization and block polymerization that utilize polymerization initiators can be used. Although a molecular weight is also not particularly limited, it is preferably within a range of 5,000 to 100,000 as a weight-average molecular weight (determined by gel permeation chromatography, in terms of polyethylene glycol) to achieve good dispersibility.

Preferably, (A) the polycarboxylic acid polymer is contained in a gypsum dispersant of the present invention as a partially or fully neutralized form, which has been neutralized with a neutralizer, such as lithium hydroxide, potassium hydroxide, sodium hydroxide, ammonia, an alkylamine, or an organic amine.

(B) the polymer obtained by a reaction of an alkylene diamine and/or a monoamine and an epihalohydrin as essential components will be explained.

As the alkylene diamine described above, preferably used is an alkylene diamine of General Formula (1):

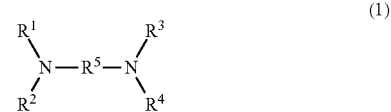

(where each of $R^1$ and $R^2$ is a $C_{1-5}$ alkyl group or a $C_{1-4}$ hydroxyalkyl group; each of $R^3$ and $R^4$ is a hydrogen atom or a $C_{1-5}$ alkyl group or a $C_{1-4}$ hydroxyalkyl group; and $R^5$ is a $C_{2-6}$ alkylene group).

Specific examples of the alkylene diamine include dimethyl amino ethylamine, diethyl amino ethylamine, dimethyl amino propylamine, diethyl amino propylamine, 3-methyl amino propylamine, N,N,N',N'-tetramethyl ethylenediamine, N,N,N',N'-tetraethyl ethylenediamine, N,N,N',N'-tetramethyl propylenediamine, N,N,N',N'-tetraethyl propylenediamine, N,N,N',N'-tetrahydroxyethyl ethylenediamine, N,N-dimethyl-N',N'-dihydroxyethyl propylenediamine, diethyl amino 4-aminopentane, tetramethyl hexamethylenediamine, tetramethyl 1,3-butanediamine, and tetramethyl phenylenediamine. Among them, dimethyl amino propylamine and diethyl amino propylamine are preferable.

Specific examples of the monoamine described above include monoamines having alkyl groups, such as methylamine, dimethylamine, ethylamine, diethylamine, n-propylamine, di-n-propylamine, isopropylamine, diisopropylamine, n-butylamine, di-n-butylamine, s-butylamine, di-s-butylamine, t-butylamine, di-t-butylamine, hexylamine, dihexylamine, cyclohexylamine, dicyclohexylamine, 2-ethylhexylamine, and di(2-ethylhexyl)amine; monoamines having alkenyl groups, such as allylamines and diallylamines; monoamines having hydroxyalkyl groups, such as monoethanolamine, diethanolamine, hydroxypropylamine, dihydroxypropylamine, N-methyl ethanolamine, and aminobenzoic acid; monoamines having phenyl groups, such as aniline and diphenylamine; monoamines having benzyl groups, such as benzylamine and dibenzylamine; and ammonia.

One of, or two or more of components can be selected from either alkylene diamines or monoamines, or can be selected from both alkylene diamines and monoamines and be used in combination.

Examples of the epihalohydrin include epichlorohydrin, epibromohydrin, and methyl epichlorohydrin; and they can be used alone, or two or more of them can be used in combination. Among these epihalohydrins, epichlorohydrin is most preferable.

A reaction molar ratio of the alkylene diamine and/or the monoamine and the epihalohydrin is preferably within a range of 2:1 to 1:2. When the reaction is conducted at a molar ratio within this range, an obtained polymer will have a molecular weight of suitable viscosity, and thus good dispersibility can be obtained. The weight-average molecular weight of the polymer is usually 1,000 to 1,000,000, preferably, 2,000 to 500,000, and more preferably, 3,000 to 100,000.

Although the ratio of the component (A) and the component (B) is not particularly limited, it is preferably (A):(B) =1:1 to 30:1, and more preferably 2:1 to 20:1, as a mass ratio.

Although the mechanism how fluidity is constantly imparted to gypsum slurry using a gypsum dispersant of the present invention is unknown, it is supposed that the component (B) selectively adsorb to impurities that are in gypsum raw materials and inhibit function of the dispersant. Accordingly, the component (B) can be used as a gypsum additive, together with a dispersant other than the component (A), such as lignin sulfonate, a naphthalenesulfonic acid formalin high condensated salt, a melamine sulfonic acid formalin high condensated salt, a polystyrene sulfonate, and an aqueous vinyl copolymer.

To gypsum raw materials, usually 0.01% by mass to 5% by mass (the solid mass ratio of the dispersant) of a gypsum dispersant of the present invention may be added for use. Although a variety of methods are used for addition of the dispersant, generally the dispersant is added in water to be diluted firstly, and then gypsum is kneaded with the water to prepare gypsum slurry. The component (A) and the component (B) can be mixed prior to addition, or each of them can be added individually without mixing. When each of them is added individually, any order of addition can be taken.

Gypsum includes anhydrous gypsum, gypsum hemihydrate, and gypsum dihydrate. As the gypsum raw materials, natural gypsum, or chemical gypsum such as neutralized gypsum and by-product gypsum can be used alone, or two or more of them can be used upon mixing. Main examples of the chemical gypsum include phosphoric acid gypsum, fluorogypsum, titanium gypsum, and flue gas desulfurization gypsum. The gypsum raw materials may contain recycled gypsum. The recycled gypsum may be a recycled gypsum collected from waste gypsum boards generated in gypsum board manufacturers, or a recycled gypsum collected from waste gypsum boards or the like generated upon construction or scrapping. A gypsum dispersant of the present invention can suitably be used for any of such gypsum raw materials, and shows excellent effects even for gypsum blended at various ratios.

Examples of an additive that is used for gypsum boards and the like in addition to a gypsum dispersant of the present invention, include a universal water reducing agent, a foaming agent such as an alkyl sulfate, an alkyl ether sulfate, and an alkyl sulfonate, an antifoaming agent, a foam stabilizer, a curing control agent, a water repellant, an adhesive, and a retardant. In addition, glass fiber, carbon fiber, waste paper, virgin pulp, and the like may be added as reinforced fiber, or gypsum boards may be prepared with a lightweight aggregate, such as pearlite and foamed steel.

A dispersant of the present invention can easily be applied to gypsum plaster that is used in finishing coat.

EXAMPLES

The present invention will be explained according to specific examples; however, the present invention is not limited to these examples. Unless otherwise noted, copolymerization ratios and mixing ratios are based on mass.

(A) Polycarboxylic Acid Polymer (A) a polycarboxylic acid polymer used in examples herein will be explained below.

<A1> A copolymerized material of (a1) a methacrylic acid ester of polyethylene glycol (46 mol) monomethylether and (b1) a methacrylic acid ((a1):(b1)=9:1; the weight-average molecular weight was 25,000).

<A2> A copolymerized material of (a2) a methacrylic acid ester of polyethylene glycol (90 mol) monomethylether, (b1) a methacrylic acid, and (c1) a polyamide polyamine monomer ((a2):(b1):(c1)=77:13:10; the weight-average molecular weight was 44,000; the copolymer disclosed in Example 2 in Japanese Patent Application Publication No. 2007-320786).

<A3> A copolymerized material of (a3) a 3-methyl-3-buten-1-ol 50EO2PO adduct and (b2) fumaric acid ((a3):(b2) =8:2; the weight-average molecular weight was 30,000).

(B) Manufacture of Polymer of Amine and Epihalohydrin

Reaction products of an alkylene diamine and/or a monoamine and an epihalohydrin used in examples herein (B1 to B11) were manufactured following the procedure described below.

<Measuring Condition of Molecular Weight>

Column: OHpacSB-806MHQ, OHpacSB-8041-IQ, OHpacSB-803HQ (manufactured by Showa Denko K.K.)

Eluent: 0.5M acetic acid and sodium nitrate aqueous solution

Detector: Differential refractometer

Standard Curve: Based on pullulan

Synthesis Example 1

In a four-neck flask, 116 g (1 mol) of N,N,N',N'-tetramethyl ethylenediamine and 171 g of water were placed, and sufficiently mixed. Then, 94 g (0.9 mol) of 35% hydrochloric acid was gradually added thereto at a temperature of 40° C. or below to prepare a hydrochloride of an amine. After that, the mixture was heated to raise the temperature to 70° C., and 83.3 g (0.9 mol) of an epichlorohydrin was dropped therein over about two hours. During dropping, the temperature was maintained at 70° C. to 80° C. After dropping of the epichlorohydrin was completed, the reaction was continued for six hours at the same temperature to obtain the 50% by mass aqueous solution of the polymer B1. The weight-average molecular weight of the obtained polymer was 223,000.

Synthesis Example 2

190 g (1 mol) of N,N-dimethyl-N',N'-dihydroxyethyl propylenediamine and 88 g (0.95 mol) of an epichlorohydrin were reacted in the same manner as in the case of Synthesis Example 1 to obtain the 50% by mass aqueous solution of the polymer B2. The weight-average molecular weight of the obtained polymer was 125,000.

Synthesis Example 3

236 g (1 mol) of N,N,N',N'-tetrahydroxyethyl ethylenediamine and 92.5 (1 mol) of an epichlorohydrin were reacted in the same manner as in the case of Synthesis Example 1 to obtain the 50% by mass aqueous solution of the polymer B3. The weight-average molecular weight of the obtained polymer was 573,000.

Synthesis Example 4

236 g (1 mol) of N,N,N',N'-tetrahydroxyethyl ethylenediamine and 50.9 (0.55 mol) of an epichlorohydrin were reacted in the same manner as in the case of Synthesis Example 1 to obtain the 50% by mass aqueous solution of the polymer B4. The weight-average molecular weight of the obtained polymer was 63,000.

Synthesis Example 5

In a four-neck flask, 116 g (1 mol) of diethyl amino ethylamine and 196 g of water were placed, and sufficiently mixed. 88 g (0.95 mol) of an epichlorohydrin was dropped therein over about two hours, as the temperature was maintained at 40° C. to 50° C. After dropping was completed, the reaction was continued for one hour at the same temperature, and was further continued for eight hours at 70° C. to 80° C. to obtain the 50% by mass aqueous solution of the polymer B5. The weight-average molecular weight of the obtained polymer was 21,000.

Synthesis Example 6

102 g (1 mol) of dimethyl amino propylamine and 92.5 g (1 mol) of an epichlorohydrin were reacted in the same manner as in the case of Synthesis Example 5 to obtain the 50% by mass aqueous solution of the polymer B6. The weight-average molecular weight of the obtained polymer was 35,000.

Synthesis Example 7

102 g (1 mol) of dimethyl amino propylamine and 55.5 g (0.6 mol) of an epichlorohydrin were reacted in the same manner as in the case of Synthesis Example 5 to obtain the 50% by mass aqueous solution of the polymer B7. The weight-average molecular weight of the obtained polymer was 5,300.

Synthesis Example 8

45.1 g (1 mol) of dimethylamine and 92.5 g (1 mol) of an epichlorohydrin were reacted in the same manner as in the case of Synthesis Example 5 to obtain the 50% by mass aqueous solution of the polymer B8. The weight-average molecular weight of the obtained polymer was 620,000.

Synthesis Example 9

45.1 g (1 mol) of dimethylamine and 46.3 g (0.5 mol) of an epichlorohydrin were reacted in the same manner as in the case of Synthesis Example 5 to obtain the 50% by mass aqueous solution of the polymer B9. The weight-average molecular weight of the obtained polymer was 6,600.

Synthesis Example 10

22.6 g (0.5 mol) of dimethylamine, 51 g (0.5 mol) of dimethyl amino propylamine, and 92.5 g (1 mol) of an epichlorohydrin were reacted in the same manner as in the case of Synthesis Example 5 to obtain the 50% by mass aqueous solution of the polymer B10. The weight-average molecular weight of the obtained polymer was 960,000.

Synthesis Example 11

22.6 g (0.5 mol) of dimethylamine, 51 g (0.5 mol) of dimethyl amino propylamine, and 46.3 g (0.5 mol) of an epichlorohydrin were reacted in the same manner as in the case of Synthesis Example 5 to obtain the 50% by mass aqueous solution of B11. The weight-average molecular weight of the obtained polymer was 9,000.

The compositions of the gypsum raw materials used in a performance test are shown in Table 1.

The gypsum dispersants of Examples 1 to 51 and Comparative Examples 1 to 3 were prepared at the composition ratios shown in Table 2, and dispersibility of gypsum and delay of gypsum curing were tested by the method described below.

TABLE 1

| | Calcined Gypsum Mixing Ratio (mass %) | | |
|---|---|---|---|
| No. | Natural | Flue Gas Desulfurization | Other By-product (Containing Recycled Gypsum) |
| 1 | 55 | 25 | 20 |
| 2 | 45 | 30 | 25 |
| 3 | 35 | 30 | 35 |
| 4 | 25 | 30 | 45 |
| 5 | 25 | 40 | 35 |

As calcined gypsum of No. 6, commercially available Cherry Mark calcined gypsum A-grade manufactured by YOSHINO GYPSUM Co., Ltd. was used.

Performance Test

<Dispersibility of Gypsum>

The component (A) and the component (B) were mixed at each of the mixing ratios (mass ratios) as shown in Table 2 (Tables 2-1 and 2-2) to prepare gypsum dispersants of Examples 1 to 51 and Comparative Examples 1 to 3 as follows: 0.18 g of each of the dispersants was weighed based on a solid content (to gypsum, 0.06% by mass), and water was added thereto as kneading water so that the total amount was adjusted to 195 g. To the mixture, 300 g of calcined gypsum having a mixing composition shown in Table 1 or of a commercially available calcined gypsum (No. 6) was added (65% of a water/gypsum ratio), and the resultant mixture was kneaded in a small juicer/blender for 10 seconds.

At the center of an urethane board (35 cm×35 cm), a hollow cylinder having an upper inner diameter of 75 mm, a lower inner diameter of 85 mm, and a height of 40 mm was prepared in advance, and the kneaded gypsum slurry was immediately poured into a container (hollow cylinder) until the container became full. Then, the hollow cylinder was pulled up to the direction perpendicular to the urethane board, and the spread of the gypsum slurry was measured. A first diameter that may represent the maximum spread and a second diameter perpendicular to the first diameter were measured, and an average value thereof was evaluated as an index of dispersibility.

The obtained results (average values of diameters) are shown in Table 2 (Tables 2-1 and 2-2).

Delay of Gypsum Curing

Similarly to the dispersibility test, 0.18 g of each of the gypsum dispersants of Examples 1 to 51 and Comparative Examples 1 to 3 was accurately weighed based on a solid content (to gypsum, 0.06% by mass), and kneading water was added thereto so that the total amount was adjusted to 195 g. To the mixture, 300 g of calcined gypsum having a mixing composition shown in Table 1 or of a commercially available calcined gypsum (No. 6) was added (65% of a water/gypsum ratio), and the resultant mixture was kneaded in a small juicer/blender for 10 seconds.

After kneading, the prepared gypsum slurry was immediately transferred in a paper cup, and a digital thermometer was placed therein, in order to measure a temperature according to exothermic heat resulting from curing of gypsum, every ten seconds. The time spent to reach the maximum temperature was identified as the time for the peak temperature, and was used as an index to evaluate delay of curing.

The obtained results (time for the peak temperatures) are shown in Table 2 (Tables 2-1 and 2-2).

TABLE 2-1

Evaluation Result of Dispersibility and Curability

| Example No. | A | B | A:B[1] | Dispersibility (mm)[2] | | | | | | Curability[2] | | | | | |
|---|---|---|---|---|---|---|---|---|---|---|---|---|---|---|---|
| | | | | 1 | 2 | 3 | 4 | 5 | 6 | 1 | 2 | 3 | 4 | 5 | 6 |
| 1 | A1 | B1 | 5:1 | 183 | 184 | 186 | 189 | 188 | 192 | 14'30" | 14'20" | 13'50" | 13'30" | 13'40" | 27'50" |
| 2 | | B2 | 5:1 | 180 | 185 | 188 | 189 | 188 | 191 | 14'30" | 14'00" | 13'40" | 13'10" | 13'50" | 27'40" |
| 3 | | B3 | 5:1 | 182 | 186 | 188 | 190 | 189 | 193 | 14'20" | 13'40" | 13'20" | 13'00" | 13'30" | 27'50" |
| 4 | | B4 | 5:1 | 184 | 185 | 190 | 191 | 187 | 195 | 14'30" | 13'50" | 13'40" | 13'10" | 13'30" | 27'30" |
| 5 | | B5 | 5:1 | 190 | 195 | 197 | 198 | 195 | 198 | 14'40" | 14'20" | 13'40" | 13'20" | 13'40" | 27'20" |
| 6 | | B6 | 1:1 | 178 | 178 | 179 | 181 | 181 | 180 | 14'30" | 14'20" | 13'50" | 13'00" | 14'00" | 27'20" |
| 7 | | | 5:1 | 192 | 195 | 196 | 198 | 199 | 198 | 14'20" | 14'00" | 13'40" | 13'10" | 13'30" | 27'40" |
| 8 | | | 10:1 | 188 | 190 | 192 | 195 | 193 | 196 | 14'50" | 14'30" | 14'20" | 13'40" | 14'00" | 28'00" |
| 9 | | | 30:1 | 187 | 190 | 191 | 195 | 194 | 198 | 15'00" | 14'40" | 14'30" | 14'00" | 14'20" | 28'10" |
| 10 | | B7 | 1:1 | 180 | 179 | 181 | 183 | 182 | 183 | 14'20" | 14'30" | 13'50" | 13'10" | 14'20" | 27'00" |
| 11 | | | 5:1 | 192 | 194 | 197 | 199 | 196 | 197 | 14'10" | 14'00" | 13'50" | 13'00" | 13'30" | 27'20" |
| 12 | | | 10:1 | 191 | 193 | 194 | 198 | 199 | 197 | 14'30" | 14'10" | 14'10" | 13'30" | 14'00" | 28'00" |
| 13 | | | 30:1 | 189 | 191 | 195 | 198 | 196 | 198 | 15'00" | 14'20" | 14'20" | 13'50" | 14'10" | 28'20" |
| 14 | | B8 | 1:1 | 178 | 179 | 181 | 183 | 181 | 183 | 14'20" | 14'00" | 13'50" | 13'30" | 14'00" | 27'30" |
| 15 | | | 5:1 | 185 | 188 | 189 | 191 | 188 | 195 | 14'30" | 14'20" | 13'50" | 13'10" | 13'40" | 27'40" |
| 16 | | | 10:1 | 184 | 186 | 193 | 195 | 190 | 197 | 14'40" | 14'10" | 14'10" | 13'30" | 14'00" | 28'20" |
| 17 | | | 30:1 | 182 | 188 | 192 | 193 | 189 | 198 | 15'00" | 14'30" | 14'10" | 13'40" | 14'10" | 28'30" |
| 18 | | B9 | 1:1 | 180 | 181 | 182 | 185 | 183 | 185 | 14'30" | 14'00" | 13'50" | 13'30" | 14'10" | 27'40" |
| 19 | | | 5:1 | 189 | 193 | 196 | 199 | 196 | 198 | 14'50" | 14'10" | 13'30" | 13'10" | 13'50" | 27'30" |
| 20 | | | 10:1 | 190 | 194 | 198 | 199 | 195 | 199 | 14'20" | 14'20" | 14'20" | 13'30" | 14'00" | 28'20" |
| 21 | | | 30:1 | 184 | 188 | 193 | 196 | 191 | 198 | 15'00" | 14'20" | 14'10" | 13'30" | 14'00" | 28'20" |
| 22 | | B10 | 1:1 | 176 | 178 | 179 | 181 | 179 | 180 | 14'30" | 14'20" | 14'00" | 13'40" | 14'10" | 27'20" |
| 23 | | | 5:1 | 180 | 184 | 187 | 188 | 189 | 194 | 14'40" | 14'10" | 13'40" | 13'30" | 14'00" | 27'50" |
| 24 | | | 10:1 | 184 | 185 | 192 | 194 | 190 | 197 | 14'40" | 14'10" | 13'50" | 13'50" | 14'00" | 28'00" |
| 25 | | | 30:1 | 184 | 188 | 190 | 192 | 189 | 198 | 15'10" | 14'30" | 14'00" | 13'40" | 13'50" | 28'20" |

[1]Mass ratio
[2]The numbers 1 to 6 in the columns of Dispersibility and Curability refer to the numbers of calcined gypsum used (see Table 1 and the like).

TABLE 2-2

Evaluation Result of Dispersibility and Curability

| Example No. | A | B | A:B[1] | Dispersibility (mm)[2] | | | | | | Curability[2] | | | | | |
|---|---|---|---|---|---|---|---|---|---|---|---|---|---|---|---|
| | | | | 1 | 2 | 3 | 4 | 5 | 6 | 1 | 2 | 3 | 4 | 5 | 6 |
| 26 | A1 | B11 | 1:1 | 181 | 181 | 183 | 185 | 183 | 185 | 14'20" | 14'10" | 14'00" | 13'30" | 14'00" | 27'00" |
| 27 | | | 5:1 | 189 | 194 | 195 | 198 | 196 | 198 | 14'20" | 14'00" | 13'50" | 13'00" | 13'50" | 27'50" |
| 28 | | | 10:1 | 187 | 190 | 195 | 199 | 193 | 199 | 14'30" | 14'20" | 13'40" | 13'30" | 14'10" | 28'10" |
| 29 | | | 30:1 | 186 | 188 | 193 | 198 | 196 | 198 | 15'20" | 14'20" | 14'10" | 13'50" | 13'40" | 28'10" |
| 30 | A2 | B1 | 5:1 | 191 | 193 | 197 | 200 | 198 | 201 | 14'20" | 14'00" | 13'50" | 13'20" | 13'40" | 27'00" |
| 31 | | B2 | | 190 | 192 | 196 | 203 | 200 | 203 | 14'20" | 14'20" | 14'00" | 13'30" | 13'40" | 26'50" |
| 32 | | B3 | | 188 | 194 | 196 | 202 | 198 | 203 | 14'40" | 14'30" | 14'10" | 13'30" | 13'50" | 27'10" |
| 33 | | B4 | | 192 | 196 | 200 | 206 | 202 | 208 | 14'10" | 14'20" | 14'10" | 13'30" | 13'20" | 27'00" |
| 34 | | B5 | | 193 | 195 | 199 | 202 | 201 | 210 | 14'30" | 14'10" | 13'40" | 13'00" | 13'30" | 27'20" |
| 35 | | B6 | | 195 | 198 | 202 | 207 | 205 | 209 | 14'10" | 13'50" | 13'30" | 13'10" | 13'40" | 27'20" |
| 36 | | B7 | | 196 | 201 | 207 | 213 | 210 | 213 | 14'30" | 14'00" | 13'30" | 13'20" | 13'30" | 27'30" |
| 37 | | B8 | | 194 | 198 | 202 | 206 | 207 | 211 | 14'20" | 14'00" | 13'40" | 13'20" | 13'30" | 26'50" |
| 38 | | B9 | | 196 | 201 | 208 | 212 | 209 | 212 | 14'30" | 14'10" | 13'30" | 13'30" | 13'20" | 26'20" |
| 39 | | B10 | | 192 | 196 | 202 | 206 | 203 | 208 | 14'20" | 13'50" | 13'40" | 13'30" | 13'40" | 27'00" |
| 40 | | B11 | | 197 | 201 | 206 | 215 | 211 | 216 | 14'40" | 13'50" | 13'50" | 13'30" | 14'00" | 27'30" |
| 41 | A3 | B1 | | 190 | 193 | 196 | 198 | 195 | 198 | 14'40" | 14'20" | 14'10" | 14'10" | 14'00" | 28'20" |
| 42 | | B2 | | 192 | 194 | 197 | 200 | 199 | 200 | 15'00" | 14'40" | 14'20" | 14'10" | 14'10" | 28'00" |
| 43 | | B3 | | 190 | 193 | 195 | 199 | 195 | 199 | 15'20" | 15'00" | 14'40" | 14'20" | 14'30" | 28'10" |
| 44 | | B4 | | 192 | 196 | 202 | 204 | 203 | 206 | 15'10" | 15'10" | 14'30" | 14'20" | 14'40" | 28'00" |
| 45 | | B5 | | 195 | 197 | 201 | 205 | 203 | 205 | 14'50" | 14'40" | 14'30" | 14'30" | 14'20" | 28'20" |

TABLE 2-2-continued

Evaluation Result of Dispersibility and Curability

| Example | | | | Dispersibility (mm)*2 | | | | | | Curability*2 | | | | | |
|---|---|---|---|---|---|---|---|---|---|---|---|---|---|---|---|
| No. | A | B | A:B*1 | 1 | 2 | 3 | 4 | 5 | 6 | 1 | 2 | 3 | 4 | 5 | 6 |
| 46 | | B6 | | 198 | 199 | 206 | 210 | 208 | 209 | 14'50" | 14'30" | 14'10" | 13'40" | 13'50" | 27'50" |
| 47 | | B7 | | 199 | 201 | 207 | 210 | 206 | 210 | 14'30" | 14'40" | 14'00" | 13'30" | 13'40" | 27'40" |
| 48 | | B8 | | 193 | 197 | 202 | 204 | 202 | 206 | 15'00" | 14'50" | 14'20" | 13'50" | 14'00" | 28'10" |
| 49 | | B9 | | 198 | 202 | 207 | 210 | 209 | 210 | 15'10" | 14'50" | 14'20" | 14'10" | 14'10" | 28'20" |
| 50 | | B10 | | 194 | 197 | 200 | 204 | 197 | 205 | 15'20" | 15'00" | 14'30" | 14'00" | 13'50" | 28'20" |
| 51 | | B11 | | 199 | 203 | 206 | 211 | 209 | 212 | 15'30" | 15'00" | 14'20" | 14'20" | 13'40" | 28'40" |
| Comparative Example 1 | A1 | — | — | 135 | 138 | 143 | 147 | 145 | 200 | 16'40" | 16'30" | 16'20" | 15'50" | 16'00" | 28'30" |
| Comparative Example 2 | A2 | — | — | 145 | 148 | 153 | 155 | 157 | 220 | 15'30" | 15'10" | 15'00" | 15'00" | 15'10" | 27'30" |
| Comparative Example 3 | A3 | — | — | 150 | 152 | 156 | 157 | 156 | 212 | 16'30" | 16'30" | 16'00" | 15'40" | 15'50" | 28'50" |

*1Mass ratio
*2The numbers 1 to 6 in the columns of Dispersibility and Curability refer to the numbers of calcined gypsum used (see Table 1 and the like).

As shown in Table 2 (Tables 2-1 and 2-2), gypsum slurry to which each of the gypsum dispersants of Examples 1 to 51 was added showed excellent dispersibility and reduced delay of curing, even if the gypsum raw materials used are different in quality.

On the other hand, although some of the gypsum dispersants of Comparative Examples 1 to 3, which contain no condensate of an amine and an epihalohydrin, showed results comparable to those of the examples when commercially available calcined gypsum No. 6 was used, both dispersibility and delay of curing were inferior compared to the examples in the use of the calcined gypsum of No. 1 to No. 5, which reflect actual gypsum blending performed in factories for manufacturing gypsum boards.

The invention claimed is:
1. A gypsum dispersant, characterized by comprising:
(A) a polycarboxylic acid polymer; and
(B) a polymer obtained by a reaction of an alkylene diamine and an epihalohydrin or a reaction of an alkylene diamine, a monoamine and an epihalohydrin.
2. The gypsum dispersant according to claim 1, wherein the alkylene diamine is represented by General Formula (1):

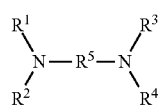

(where each of $R^1$ and $R^2$ is a $C_{1-5}$ alkyl group or a $C_{1-4}$ hydroxyalkyl group; each of $R^3$ and $R^4$ is a hydrogen atom or a $C_{1-5}$ alkyl group or a $C_{1-4}$ hydroxyalkyl group; and $R^5$ is a $C_{2-6}$ alkylene group).
3. The gypsum dispersant according to claim 1, wherein the alkylene diamine is a dialkylaminoalkylamine.
4. The gypsum dispersant according to claim 1, wherein
(A) the polycarboxylic acid polymer includes a structural unit derived from (a) a polyalkylene glycol unsaturated monomer and a structural unit derived from (b) an unsaturated carboxylic acid monomer.
5. The gypsum dispersant according to claim 4, wherein the structural unit derived from (a) the polyalkylene glycol unsaturated monomer is represented by General Formula (2):

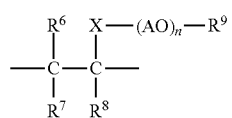

(where each of $R^6$, $R^7$, $R^8$, and $R^9$ is independently a hydrogen atom or a $C_{1-22}$ hydrocarbon group, X is —COO— or —$(CH_2)_aO$—, a is an integer of 1 to 20, AO is a $C_{2-4}$ alkylene oxy group, and n is the number of moles of added alkylene oxy groups and is 1 to 200).
6. The gypsum dispersant according to claim 1, wherein the ratio of the component (A) and the component (B) is (A):(B)= 1:1 to 30:1, as a mass ratio.
7. The gypsum dispersant according to claim 2, wherein
(A) the polycarboxylic acid polymer includes a structural unit derived from (a) a polyalkylene glycol unsaturated monomer and a structural unit derived from (b) an unsaturated carboxylic acid monomer.
8. The gypsum dispersant according to claim 3, wherein
(A) the polycarboxylic acid polymer includes a structural unit derived from (a) a polyalkylene glycol unsaturated monomer and a structural unit derived from (b) an unsaturated carboxylic acid monomer.
9. The gypsum dispersant according to claim 2, wherein the ratio of the component (A) and the component (B) is (A):(B)= 1:1 to 30:1, as a mass ratio.
10. The gypsum dispersant according to claim 3, wherein the ratio of the component (A) and the component (B) is (A):(B)=1:1 to 30:1, as a mass ratio.
11. The gypsum dispersant according to claim 4, wherein the ratio of the component (A) and the component (B) is (A):(B)=1:1 to 30:1, as a mass ratio.
12. The gypsum dispersant according to claim 7, wherein the ratio of the component (A) and the component (B) is (A):(B)=1:1 to 30:1, as a mass ratio.
13. The gypsum dispersant according to claim 8, wherein the ratio of the component (A) and the component (B) is (A):(B)=1:1 to 30:1, as a mass ratio.
14. The gypsum dispersant according to claim 5, wherein the ratio of the component (A) and the component (B) is (A):(B)=1:1 to 30:1, as a mass ratio.
15. The gypsum dispersant according to claim 1, wherein the component (B) is a polymer obtained by a reaction of an alkylene diamine and an epihalohydrin.

* * * * *